US006824189B1

(12) United States Patent
Crabb

(10) Patent No.: US 6,824,189 B1
(45) Date of Patent: Nov. 30, 2004

(54) SYSTEM FOR WRAPPING LOADS WITH A TARP

(76) Inventor: Jerry Crabb, 4363 White Oak Dr., Buford, GA (US) 30518

( * ) Notice: Subject to any disclaimer, the term of this patent is extended or adjusted under 35 U.S.C. 154(b) by 0 days.

(21) Appl. No.: 10/427,283

(22) Filed: May 1, 2003

Related U.S. Application Data
(60) Provisional application No. 60/377,422, filed on May 3, 2002, now abandoned.

(51) Int. Cl.[7] ................................................ B60P 7/04
(52) U.S. Cl. ........................ 296/100.01; 296/100.15; 296/100.16
(58) Field of Search .............................. 296/98, 100.01, 296/136.1, 100.15, 100.16; 410/100, 103, 97, 96

(56) References Cited

U.S. PATENT DOCUMENTS

| 4,380,350 | A | | 4/1983 | Block |
| 4,691,957 | A | | 9/1987 | Ellingson |
| 5,180,203 | A | | 1/1993 | Goudy |
| 5,186,231 | A | | 2/1993 | Lewis |
| 5,393,117 | A | | 2/1995 | Beale |
| 5,466,030 | A | | 11/1995 | Harris et al. |
| 5,474,354 | A | | 12/1995 | Beale |
| 5,697,663 | A | | 12/1997 | Chenowth |
| 5,882,062 | A | | 3/1999 | Chenowth |
| 5,911,467 | A | | 6/1999 | Evans et al. |
| 6,059,499 | A | * | 5/2000 | Bird ........................... 410/103 |
| 6,347,826 | B1 | | 2/2002 | Horner et al. |
| 6,513,856 | B1 | * | 2/2003 | Swanson et al. .............. 296/98 |
| 6,595,594 | B2 | * | 7/2003 | Royer ......................... 296/98 |
| 2003/0090124 | A1 | * | 5/2003 | Nolan et al. .................. 296/98 |

* cited by examiner

Primary Examiner—Jason Morrow
(74) Attorney, Agent, or Firm—Hinkle & O'Bradovich, LLC

(57) ABSTRACT

An apparatus, system and method for wrapping a tarp around a load. The system generally includes a cart that attaches to a tarp, a rigid pole placed within the tarp connecting the cart to the tarp. Typically, a powered winch includes a strap wrapped around it and the strap is connected to the cart. The winch can be connected to the cart, or to the frame of the trailer. In operation, the powered winch is energized thereby winding the strap around the winch spool, thereby drawing the cart to the trailer load and up one side of the trailer load, across the top and down the other side at which time the tarp is fully placed around the load. Multiple overlapping wheels are connected to the cart. Once the load is covered, the system can be disconnected and stored.

10 Claims, 7 Drawing Sheets

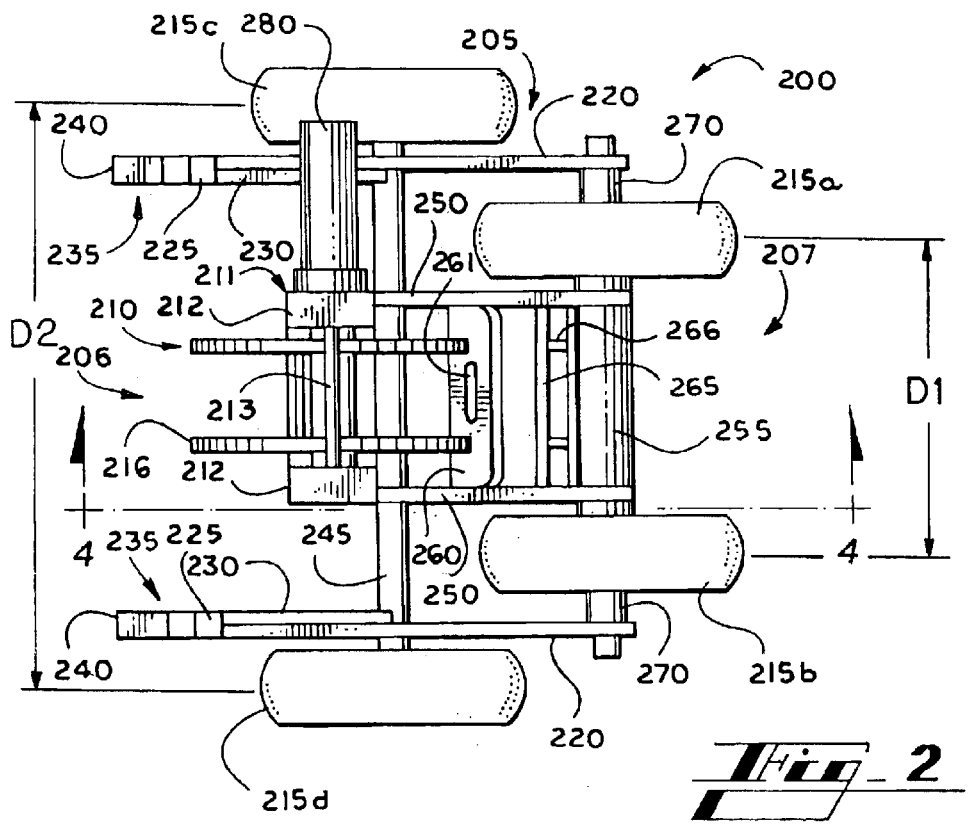
_Fig_2
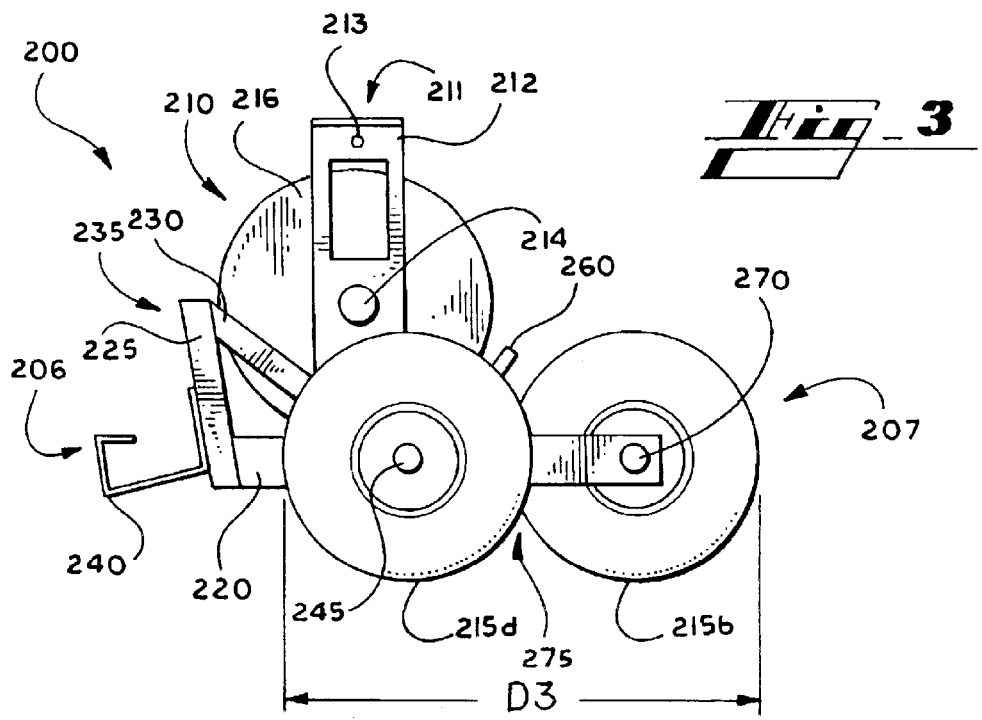
_Fig_3

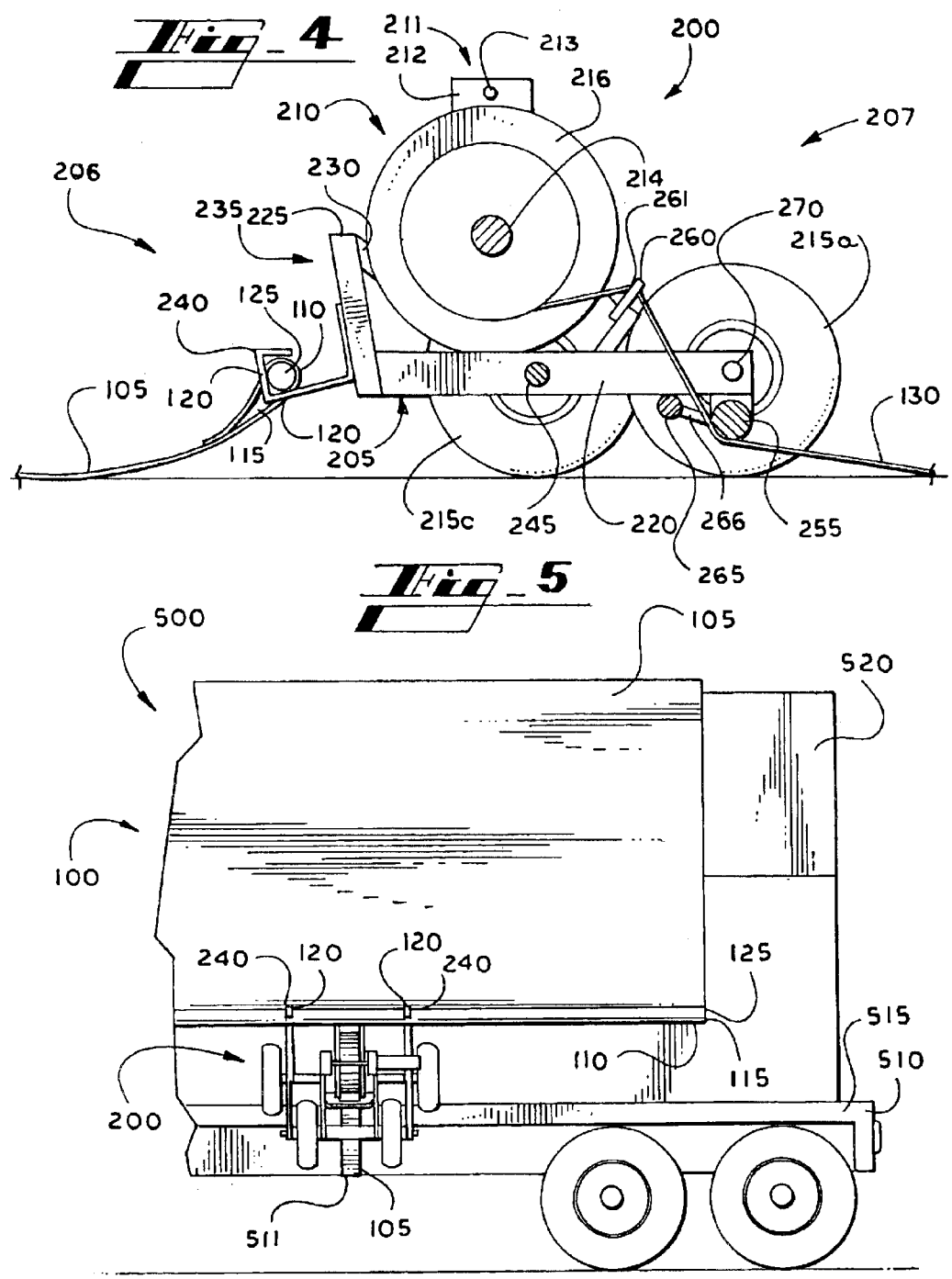

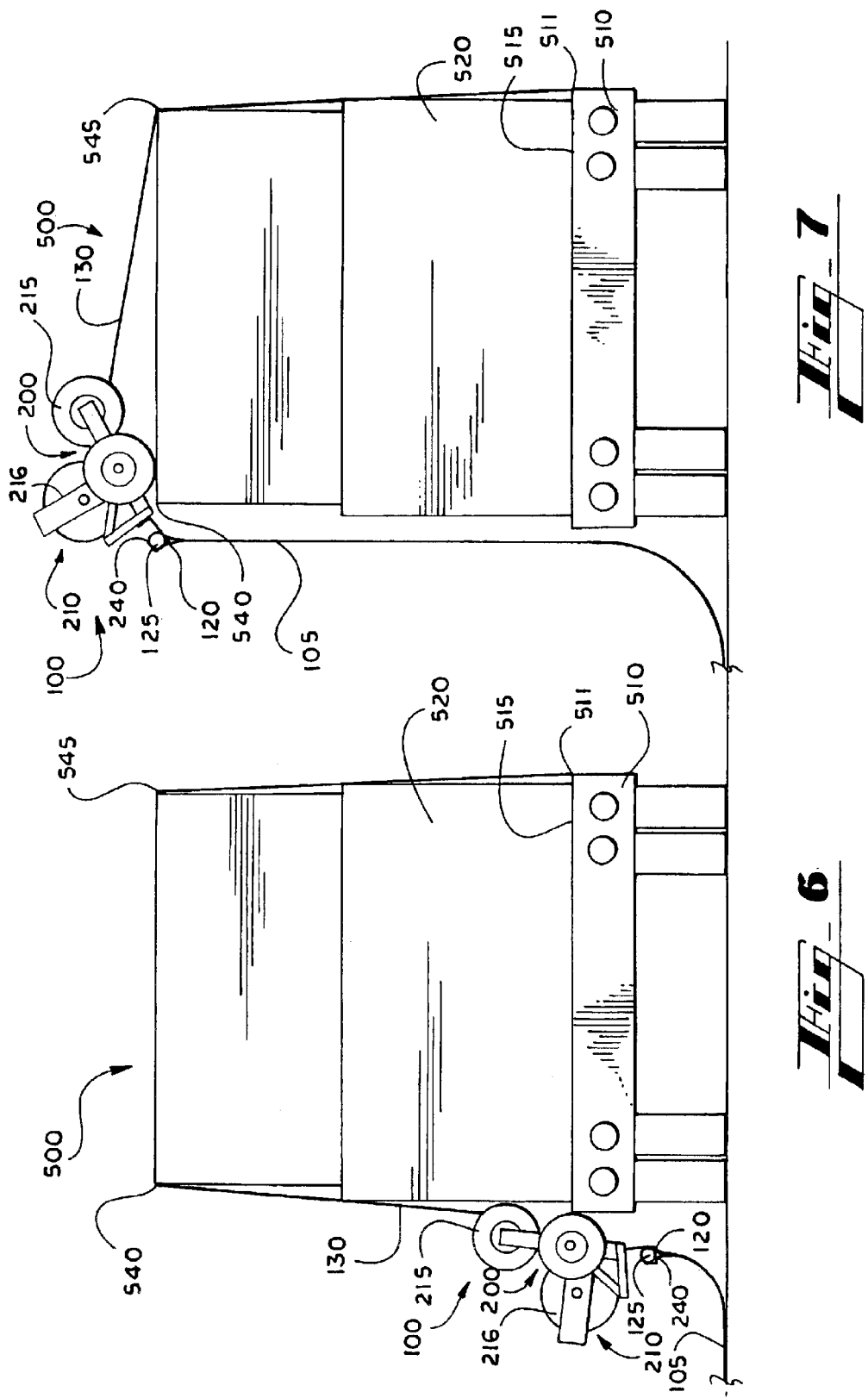

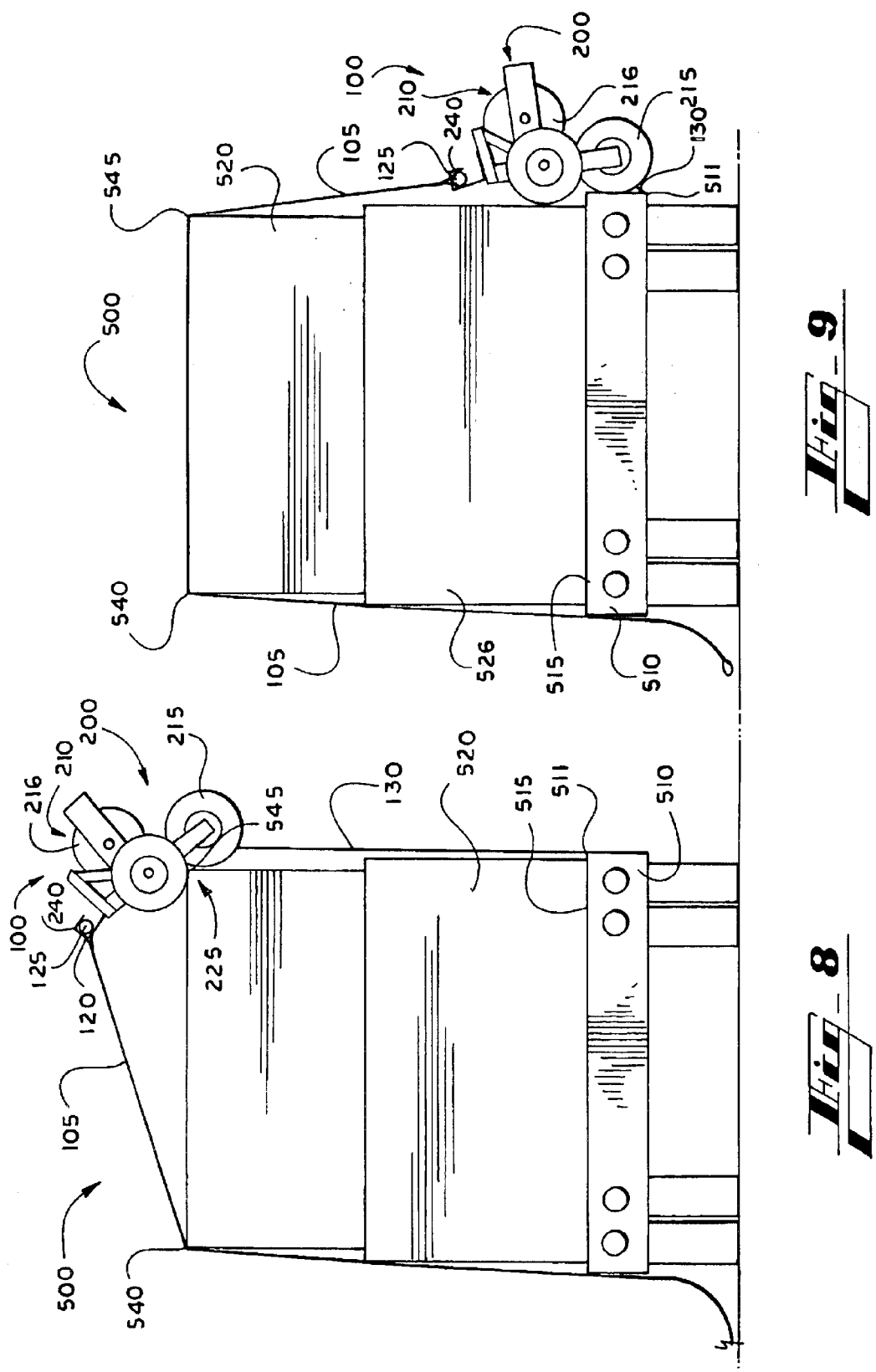

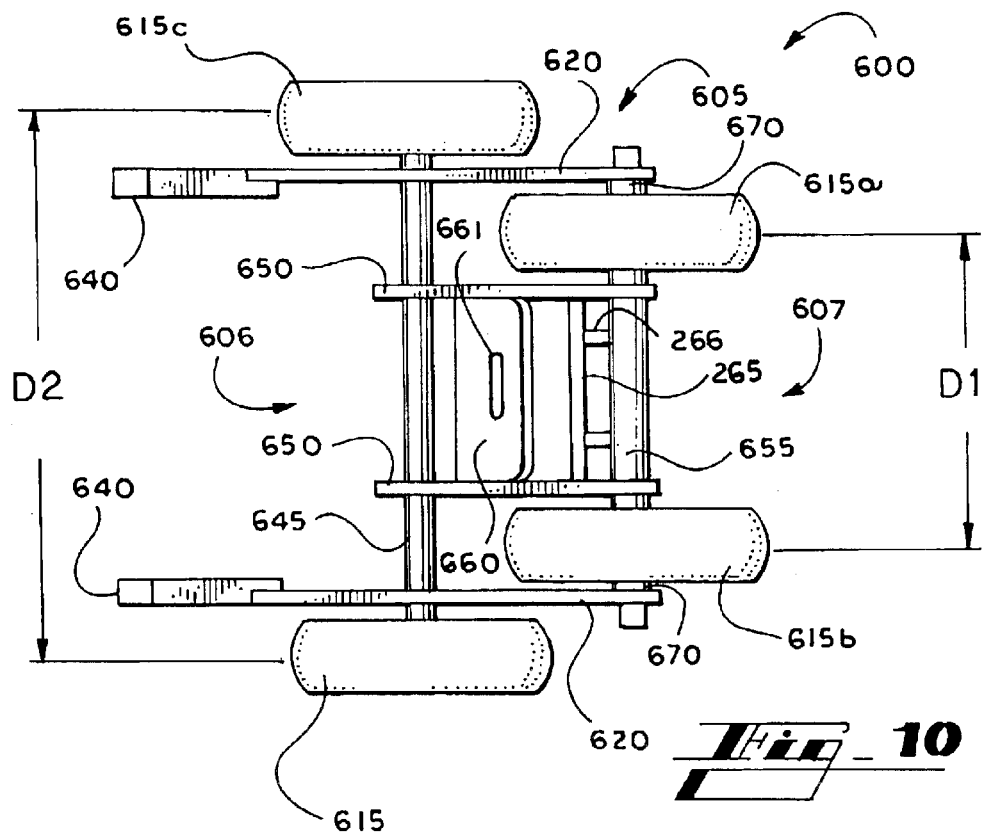
*Fig_10*
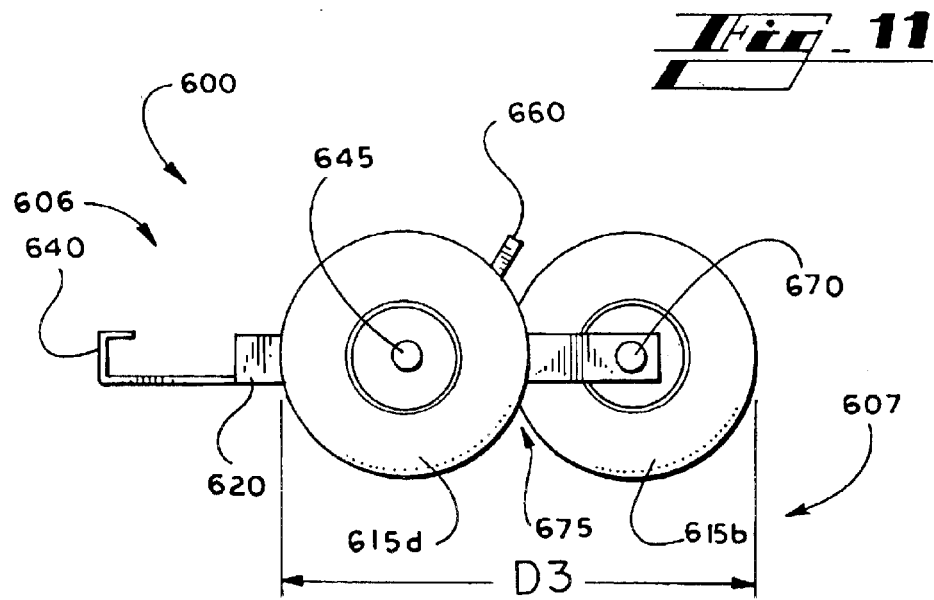
*Fig_11*

SYSTEM FOR WRAPPING LOADS WITH A TARP

Priority based on U.S. Provisional Patent Application, Ser. No. 60/377,422, filed on May 3, 2002, now abandoned and entitled "System For Wrapping Loads With A Tarp" is claimed.

BACKGROUND OF THE INVENTION

I. Field of the Invention

The present invention relates generally to the field of tarps and loads wrapped with tarps, and more particularly to an apparatus, system and method for wrapping loads with a tarp.

II. Description of the Related Art

When loads and cargo are transferred on flatbed trailers, often times a tarp is needed to cover the cargo to protect it from weather. The driver of the truck hauling the cargo is typically responsible for getting on top of the cargo and draping the tarp over the cargo. The tarp often must be dragged over the load, typically from side to side, which involves the driver having to position himself on top of the load and pulling the tarp over the load. The tarp can then be secured to the frame of the trailer.

SUMMARY

In general the invention features a system for wrapping a tarp around a load or cargo, especially a load on a flatbed trailer. The system includes a cart that attaches to a tarp, wherein a rigid pole is placed within the leading edge of the tarp and the cart is attached to the midpoint of the tarp and integral with the fixed pole. In a typical embodiment, a powered winch includes a strap wrapped around it and the strap is connected to the cart. The winch can be connected to the cart, or to the frame of the trailer. In operation, the powered winch is energized, thereby winding the strap around the winch spool, thereby drawing the cart to the trailer load and up one side of the trailer load, across the top and down the other side at which time the tarp is fully placed around the load. The system is fully automated and is controlled from a moveable control panel that is operated by the driver. Multiple wheels of the cart are configured that the pairs of the wheels are in an overlapping relationship so that the cart can negotiate right angles, and other difficult angles and turns without becoming entangled at the apex of a given angle or turn. With this overlap, the frame of the cart does not become entangled with the load. Once the tarp has been placed over the load, the cart is disengaged from the tarp and moved to another location, if needed, to place another tarp around the load.

In general, in one aspect, the invention features a load wrapping system, including a tarp, an elongated pole located in an elongated pocket on a leading edge of the tarp, a cart having a winch system, the cart being adapted to connect to the pole and a strap having one end connected to the winch and the other end including a connector adapted to connect to a load surface.

In one implementation, the cart includes a frame having hooks adapted to connect to the pole.

In another implementation, the cart includes a set of rear wheels having a diameter and separated by a first distance and a set of front wheels having a diameter and separated a second distance.

In another implementation, the distance between an outer edge of the front wheels and an outer edge of the rear wheels is less then the sum of the diameter of one of the rear wheels and the diameter of one of the front wheels.

In another implementation, the frame includes a guide plate adjacent the winch system, the strap being adapted to fit through a slit on the guide plate.

In another implementation, the frame further comprises a first short cross bar connected adjacent the front wheels and adapted to re-direct the strap.

In still another implementation, the cart includes sled blades.

In another aspect, the invention features a load wrapping system, including a tarp, an elongated pole located within an elongated pocket on a leading edge of the tarp, a cart adapted to connect to the pole, a winch system connected to a side of a loading surface and a strap having one end connected to the winch and the other end connected to the cart.

In one implementation, the cart includes a frame having hooks adapted to connect to the pole.

In another implementation, the cart includes a set of rear wheels having a diameter and separated by a first distance and a set of front wheels having a diameter and separated by a second distance.

In another implementation, the distance between the outer edge of the front wheels and an outer edge of the rear wheels is less then the sum of the diameter of one of the rear wheels and the diameter of one of the front wheels.

In another implementation, the cart includes sled blades.

In still another aspect, the invention features a load wrapping kit, including a tarp, an elongated pole adapted to be inserted into an elongated pockets located on a leading edge of the tarp, a cart adapted to be connected to the pole, a winch system, a strap adapted to be connected to the cart and to the winch system and a power source adapted to energize the winch.

In one implementation, the winch system is adapted to be connected to the cart.

In another implementation, the winch is adapted to be connected to a side of a loading surface.

In yet another aspect, the invention features a load wrapping system, including a cart connected to a tarp and means for moving the cart over and around the load to wrap the tarp over the load.

In another aspect, the invention features method of wrapping a tarp around a load on a bed, including connecting the tarp to a cart, the cart being on one side of the bed, placing a strap over the load, connecting one end of the strap to the side of the bed opposite the side near the cart, connecting the other end of the strap to the cart and moving the cart over the load, thereby covering the load with the tarp.

In one implementation, the cart includes a winch system.

In another implementation, the bed includes a winch system.

In another aspect, the invention features a load wrapping cart, including a frame having a front end and a rear end, a front set of wheels connected to the front end, a rear set of wheels connected to the rear end, the front set of wheels being separated by a distance and the rear set of wheels being separated by a distance, a cross bar connected between the rear set of wheels, a cross bar connected between the front set of wheels, a guide plate connected to the frame and two inner short bars being substantially parallel to each other and connected to and substantially perpendicular to the cross bars and being.

One advantage of the invention is that the driver of the truck hauling the flatbed trailer does not need to get on top of the load to cover the load with a tarp.

Another advantage is that the system is fully automated.

Another advantage is that the cart can move over the load without becoming entangled.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 2 illustrates a top view of an embodiment of a load wrapping cart;

FIG. 3 illustrates a side view of the embodiment of a load wrapping cart of FIG. 2;

FIG. 4 illustrates a partial cutaway side view of the embodiment of the cart of FIGS. 2-3;

FIG. 5 illustrates a partial side view of a trailer of a flat bed truck having a load with an embodiment of a load wrapping system in a final position;

FIG. 6 illustrates a rear view of a trailer of a flat bed truck having an embodiment of a load wrapping system in a first position;

FIG. 7 illustrates a rear view of a trailer of a flat bed truck having an embodiment of a load wrapping system in a second position;

FIG. 8 illustrates a rear view of a trailer of a flat bed truck having an embodiment of a load wrapping system in a third position;

FIG. 9 illustrates a rear view of a trailer of a flat bed truck having an embodiment of a load wrapping system in a final position FIG. 10 illustrates a top view of an alternate embodiment of a load wrapping cart;

FIG. 11 illustrates a side view of the embodiment of the cart of FIG. 10;

DETAILED DESCRIPTION

Figure 1:
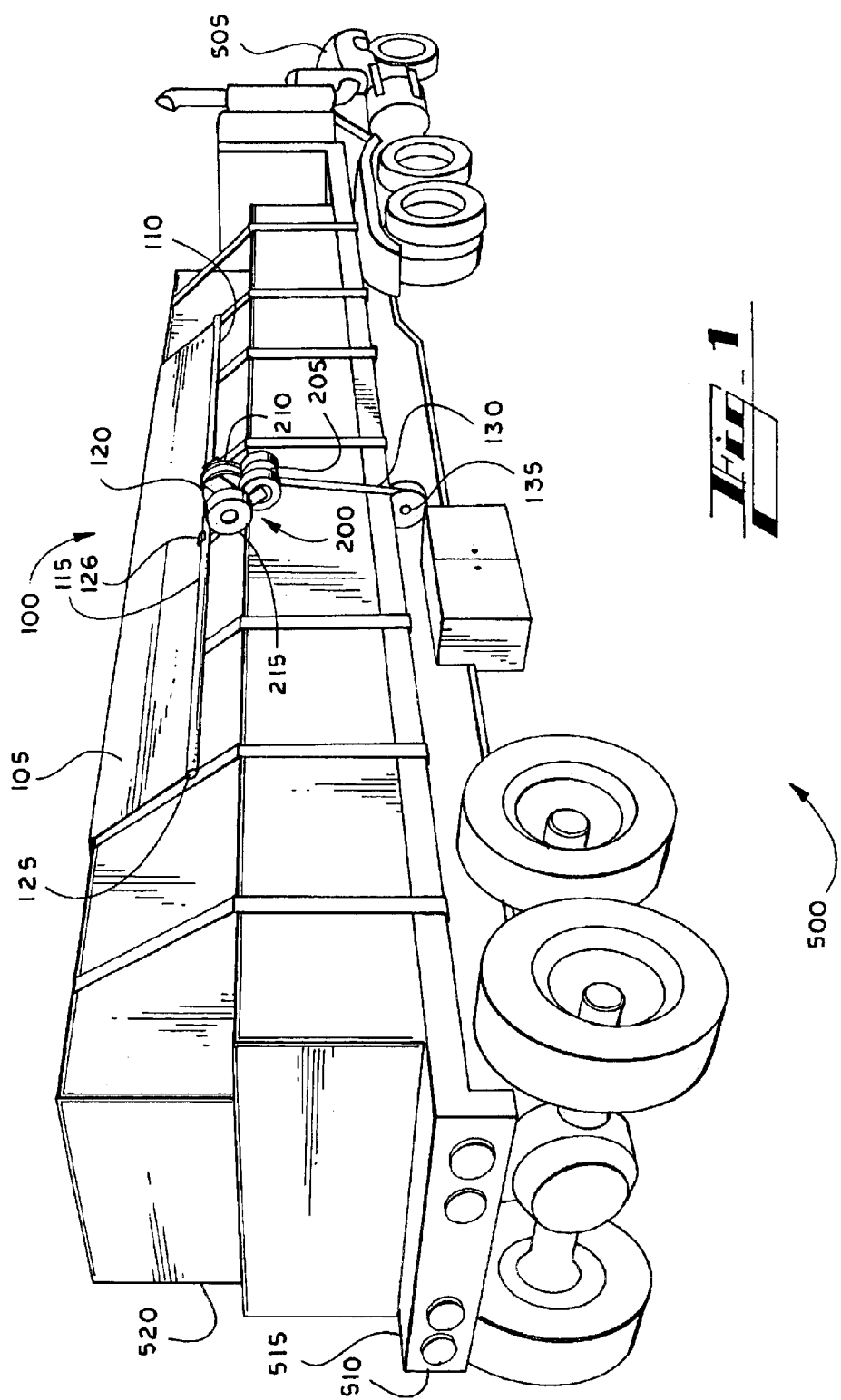
FIG. 1 illustrates a side and rear view of a flat bed truck having an embodiment of a load wrapping system connected to the trailer of the truck.

Referring to the drawings wherein like reference numerals designate corresponding parts throughout the several figures, reference is made first to FIG. 1 that illustrates a side and rear view of a flat bed truck 500 having an embodiment of a load wrapping system 100 connected to the truck 500. The truck typically includes a cab 505 and a flat bed trailer 510 having a flat surface 515. The truck 500 further includes a load 520 placed on the surface 515 of the trailer 510. The load 520 can include several boxes. It is understood that the system 100 can be used with many varieties of other trucks such as a flat bed truck without a trailer.

The load wrapping system 100 typically includes a tarp 105 having a leading edge 110 that includes an elongated pocket 115 along a length of the leading edge 110. The tarp 105 is shown partially covering the load 520. The elongated pocket 115 typically is located along the entire length of the leading edge 110, although it is understood that the elongated pocket can be a longer or shorter length as needed. The leading edge 110 or the pocket 115 can include several holes 120 that are discussed further in the description below. An elongated rigid pole 125 that is located within the elongated pocket 115. The pole 125 can typically be slide into and out of the pocket 115 as needed. The pole 125 can be either one single long pole or several shorter poles that can be interconnected to form the longer pole 120.

The system 100 further includes an embodiment of a cart 200. The cart 200 typically includes a frame 205 having a winch system 210 and wheels 215, which are discussed in further detail in the description below.

The system 100 farther includes a strap 130 having two ends. One end of the strap 130 is connected to the cart 200. The other end of the strap 130 is connected to the trailer 510. Typically, the strap is connected to a fixed point on the trailer 510 although in another implementation the strap 130 can be connected to a strap spool 135 on the trailer 510. The strap 130 is typically extended from the winch system 210 and threaded through one or more locations on the frame 205 that act as fulcrum points that alter the direction of the strap 130.

FIG. 2 illustrates a top view of an embodiment of a load wrapping cart 200. As mentioned above, the cart 200 includes a frame 205, winch system 210 connected to a winch mount 211 and wheels 215a, 215b, 215c, 215d. The frame 205 includes side bars 220 generally defining a rear end 206 and a front end 207 of the frame 205. The frame 205 further includes rear bars 225 and angled bars 230. A portion of side bars 220, the rear bars 225 and the angled bars 230 are connected together forming a triangular rear frame 235 (also see FIG. 3 below). The rear end 206 of the frame 205 includes one or more hooks 240 that are used to interconnect with the holes 120 on the tarp 105 (see FIG. 1). The hooks 240 are typically connected to the rear bars 225 of the triangular frames 235. The hooks 240 typically connect through the holes 120 on the tarp 105 to connect to the pole 125 as mentioned above and discussed further in the description below. The triangular frames 235 typically provide support for the forces that the hooks 240 bear as they pull on the pole 125. The winch mount 211 generally includes two upright and generally parallel side bars 212, a winch wheel 216 located between the side bars 212, a cross bar 213 and an axle 214 (see FIG. 3 below) about which the winch wheel 216 rotates. The winch system 210 further includes a motor 280 that is used to energize the winch wheel 216. In a typical implementation, a control unit (not shown) can be connected to the motor 280 in order to supply signals to turn the winch wheel 216. In one implementation, the control can be wired to the motor 280. In another implementation, the control can be remote using signal, such as but not limited to radio signals, to turn the winch wheel 216. In still another implementation, the cart 200 itself can include a control box to switch power on and off to turn the winch wheel 216.

The frame 205 further includes cross bar 245 that generally connects between and generally perpendicular to the side bars 220 toward the approximate center of the cart 200. A portion of the angled bars 230 can be connected to the cross bar 245 for mechanical integrity. One end of two inner short bars 250 are connected generally perpendicular to the cross bar 245 and adjacent the winch system 210. The other end of the inner short bars 250 are connected to a first short cross bar 255. The first short cross bar 255 is typically connected to the lower portion of the inner short bars 250. A guide plate 260 having a slit 261 is connected between and angled with respect to the short inner bars 250. A second short bar 265 having a guide loop 266, which is generally connected to the first and second short cross bars 255, 265, is connected between and generally perpendicular to the two inner short bars 250. Two axle bars 270 are connected between the end of the side bars 220 (at the front end 207 of the frame 205) and the end of the inner short bars 255 (at the front end 207 of the frame 205). The axle bars 270 are generally located above, offset from and in a generally parallel orientation to the first short cross bar 255.

The wheels 215 include two front wheels 215a, 215b separated by a first distance D1, and two rear wheels 215c, 215d separated by a second distance D2. Each of the front set of wheels is connected between the respective front end of the side bar 220 and the inner short bar 250. Each of the front wheels 215a, 215b is connected to and rotates about the respective axle bar 270. The rear wheels 215c, 215d are each connected to opposite ends of the cross bar 245. All the wheels 215 have substantially the same diameter. The figure illustrates that the distance D1 between the front set of wheels 215a, 215b is less than the distance D2 between the rear set of wheels 215c, 215d. As described further below, the differential in the distances D1, D2 helps the cart 200 negotiate turns when used to wrap the tarp 105 around the load 520. A further discussion of the wheel 215 orientation is discussed below in the description with respect to FIG. 3.

In another embodiment, the cart 200 can include sled blades (not shown) instead of wheels 215.

FIG. 3 illustrates a side view of the embodiment of a load wrapping cart 200 of FIG. 2. As discussed above, the cart 200 includes a frame 205, winch system 210 connected to a winch mount 211 and wheels 215a, 215b, 215c, 215d. The frame 205 includes side bars 220 generally defining a rear end 206 and a front end 207 of the frame 205. The frame 205 further includes rear bars 225 and angled bars 230. A portion of side bars 220, the rear bars 225 and the angled bars 230 are connected together forming a triangular rear frame 235. The rear end 206 of the frame 205 includes one or more hooks 240 that are used to interconnect with the holes 120 on the tarp 105 (see FIG. 1). The hooks 240 are typically connected to the rear bars 225 of the triangular frames 235. The hooks 240 typically connect through the holes 120 on the tarp 105 to connect to the pole 125 as mentioned above and discussed further in the description below. The triangular frames 235 typically provide support for the forces that the hooks 240 bear as they pull on the pole 125. The winch mount 211 generally includes two upright and generally parallel side bars 212, a winch wheel 216 located between the side bars 212, a cross bar 213 and an axle 214 about which the winch wheel 216 rotates. The cross bar 245 is shown as a pivot point on wheel 215d. One of the axle bars 270 is shown as a pivot point on wheel 215b. The guide plate 260 is shown protruding from the frame 205.

As described above, the wheels 215 include two front wheels 215a, 215b separated by a first distance D1, and two rear wheels 215c, 215d separated by a second distance D2. Each of the front set of wheels is connected between the respective front end of the side bar 220 and the inner short bar 250. Each of the front wheels 215a, 215b is connected to and rotates about the respective axle bar 270. The rear wheels 215c, 215d are each connected to opposite ends of the cross bar 245. All the wheels 215 have substantially the same diameter. The figure illustrates that the distance D1 between the front set of wheels 215a, 215b is less than the distance D2 between the rear set of wheels 215c, 215d. As described further below, the differential in the distances D1, D2 helps the cart 200 negotiate turns when used to wrap the tarp 105 around the load 520.

FIG. 3 further illustrates that the distance D3 defined between the edge of the front wheel 215b and the edge of the rear wheel 215d is generally less than the sum of the diameter of the front wheel 215b and the diameter of the rear wheel 215d. As described further below, it has been determined that this resulting overlap of the wheels allows the cart 200 to travel easier over corners of loads as the cart 200 passes over turns in the loads. In general, by the front wheels 215a, 215b and the rear wheels 215c, 215d being overlapped in such a manner, any corners of the load 520 cannot actually contact the frame 205 of the cart 200. Instead, the corners, as described, simply edge into the corner 275 formed by the overlap of the front wheels 215a, 215b and rear wheels 215c, 215d. By the wheels 215 being able to rotate freely, the cart 200 is able to pass the corner without difficulty. If the wheels 215 are not overlapped, the corner can become snagged on the frame 205. It is understood that there are a variety of distances that the front 215a, 215b wheels and rear wheels 215c, 215d can be separated and overlapped to achieve the same results. Furthermore, it is understood, that the wheels 215 could also achieve the same result if the distance is generally equal to the sum of the diameter of the wheels 215. In addition, the same result could also be achieved if the distance D3 is just larger than the sum of the diameters of the wheels 215. Furthermore, the wheels can be in different arrangements. For example, the wheels 215 can be placed at the four corners of the cart 205 as in a typical vehicular arrangement. However, the front set of wheels 215a, 215b should typically not be too far displaced from the rear set of wheels 215c, 215d because the frame 205 may then come into contact with the corner of the truck 500 and become stuck or bound. It is understood that the cart may also include sled blades. It is also understood that the cart 200 may just include a frame 205 without wheels or blades. It is further understood that the cart 200 is used as a carrying mechanism for the pole 125 and tarp 105 as well as to support the winch system 210.

FIG. 4 illustrates a partial cutaway side view of the embodiment of the cart 200 of FIGS. 2-3. The cart 200 includes a frame 205, winch system 210 connected to a winch mount 211 and wheels 215a, 215c. The frame 205 includes the side bars 220 defining the rear and front ends 206, 207. The frame 205 further includes rear bar 225 and angled bar 230 forming the rear frame 235 along with a portion of side bar 220. The hook 240, connected to rear frame 235, is interconnected through the holes 120 on the tarp 105, which includes the leading edge 110 having the elongated pocket 115 into which the pole 125 is placed. The hook 240 is thereby hooked around the pole 125. The winch mount 211 is shown with one of the upright and generally parallel side bars 212, the winch wheel 216 that is located between the side bars 212, the cross bar 213 and the axle 214 about which the winch wheel 216 rotates. The strap 130 is wrapped around the winch wheel 216.

The frame 205 further includes the cross bar 245 that generally connects between and generally perpendicular to the side bars 220 toward the approximate center of the cart 200 connecting the rear wheels 215c, 215d. The first short cross bar 255 is typically located below the axle bars 270, one of which is shown. The guide plate 260 having the slit 261 is angled with respect to the side bar 220. The second short bar 265 having the guide loop 266 is generally connected to the first and second short cross bars 255, 265. The axle bars 270 are generally located above, offset from and in a generally parallel orientation to the first short cross bar 255. From the winch wheel 216, the strap 130 can be directed through various locations on the frame 205. As shown in the figure, the strap 130 is directed through the slit 261 on the guide plate 260 and then through the guide loop 266 in between the first and second short cross bars 255, 265. The first cross bar 255 is used to re-direct the strap 130. Therefore, the strap 130 can be directed from the winch wheel 216 which is generally positioned high up on the cart 200, to a lower position on the cart 200, which is in turn closer to the load 520 that the tarp 105 is covering. In this way, both the tarp 105 and the strap 130 can generally be held close to the load 520 as the tarp 105 covers the load 520. By keeping this low profile of the tarp 105 and strap 130, various forces and torques on the cart 200 can be prevented. The strap 130 is shown as being wound from the lower part of the winch wheel 216. In another implementation, the strap 130 can be wound from the upper part of the winch wheel 216.

The following figures describe the load wrapping system 100 used to cover a load 520 on a flat bed trailer 510 during various stages of the covering process.

FIG. 5 illustrates a partial side view of a trailer 510 of a flat bed truck 500 having a load 520 with an embodiment of a load wrapping system 100 in a final position with the tarp 105 covering the load 520. In order to cover the load 520, one end of the strap 130 is typically fixed to the winch wheel 216. The slack of the strap 130 is placed over the load 520 and connected to a point 511 on the flat bed trailer 510. The details of the covering process is now discussed.

FIG. 6 illustrates a rear view of a trailer 510 of a flat bed truck 500 having an embodiment of a load wrapping system 100 in a first position. In operation of the system 100, the cart 200 is laid on one side of the truck 500, typically on or adjacent the load 520, and the strap 130 is unwound from the winch wheel 216. The strap 130 is laid over the load 520 so that the end of the strap 130 hangs over the other side of the truck 500, opposite the side where the cart 200 is laid. The end of the strap 130 is connected to the side of the truck 500 opposite the cart 200 at the fixed point 511. Typically, the end of the strap 130 includes a connector such as a hook or other suitable connecting device to secure the end of the strap 130 to the trailer 510. Once the strap 130 is secured, the winch system 210 can be energized, which winds the strap 130 back onto the winch wheel 216. The motor 280, which is part of the winch system The sides of the winch wheel 216 prevent the strap 130 from binding on itself as the strap 130 is wound onto the winch wheel 216. As the winch system 210 reels in the strap 130, the cart 200 then travels along the side of the load 520 thereby pulling the pole 125 on the hooks 240 and therefore the tarp 105. The cart 200 continues to travel along the side of the load 520 and approaches the first corner 540. As described above, the close proximity and overlap of the wheels 215 allows the cart to negotiate the corner 540 with general ease.

FIG. 7 illustrates a rear view of a trailer of a flat bed truck 500 having an embodiment of a load wrapping system 100 in a second position. The cart 200 has traveled over and cleared the first corner 540 and continues to travel over the load 520 and approaches the second corner 545. The tarp 105 now generally covers one side of the load 520 and continues to be pulled by the cart 200 as the winch wheel 216 winds up the strap 130. Due to the particular angle of the strap 130 as it travels over the second corner 545, the cart 200 can often be put into a "wheelie" position due to the weight of the tarp and pole 125 hanging on the hooks 240. However, the front wheels 215a, 215b are typically pulled back into contact with the load 520 as the cart approaches the second corner, due to the low profile of the strap 130 from passing under the first short cross bar 255 (see for example FIG. 4 above).

FIG. 8 illustrates a rear view of a trailer of a flat bed truck 500 having an embodiment of a load wrapping system 100 in a third position. This figure illustrates the advantage of the cart's overlapping front wheel 215a, 215b and rear wheel 215c, 215d arrangement. As described above with respect to FIG. 3, the inner corner 275 formed between the front wheels 215a, 215b and rear wheels 215c, 215d is used to receive a corner of the load 520 such as the second corner 545. As such, the second corner 545 does not contact the frame and therefore the cart 200 does not become bound or stuck on the load 520. As the cart 200 travels over and clears the second corner 545, the tarp 105 takes a wide angle over the top of the load 520. As the cart 200 clears the second corner 545, the wide angle decreases and the tarp 105 covers the top of the load 520. The tarp 105 now substantially covers the first side of the load 520 and generally covers the top of the load 520. The winch wheel 216 continues to wind up the strap 130. In general, during the covering process, the holes 120 on the tarp 105 through which the hooks 240 are placed allow the pole 125 to pivot about the hooks 240 as the cart 200 travels. In general, the pivoting of the pole 125 is slight.

FIG. 9 illustrates a rear view of a trailer of a flat bed truck 500 having an embodiment of a load wrapping system 100 in a final position. In general, the figure represents the rear view of the truck 500 and system 100 illustrated in FIG. 5 as a side view. The cart 200 has cleared the second corner 545 and has reached the side of the truck 500 opposite the side from which the cart 200 began. Here, the winch wheel 216 finishes winding the strap 130, which can now be disconnected from the connection point 511. The cart 200 can then typically be removed from the pole 125 by unhooking the hooks 240 and the pole 125 can be removed from elongated pocket 115 on the tarp 105. If a control is hard wired to the cart 200, then the control can be removed. The system 100 is generally compact so that it can be easily stored on the truck 500 as needed. The tarp 105 now generally covers the load 520. When removing the cart 200, the tarp 105 may not cover as much of the second side as the first side due to the length of the cart 200. As such, the operator of the system 100 can pull the tarp 105 as needed to cover any remaining desired portion of the load 520. By using the system 100 as described, the operator avoids having to climb on top of the load 520 to cover the load 520 with the tarp 105.

FIG. 10 illustrates a top view of an alternate embodiment of a load wrapping cart 600. The car 600 resembles the cart 200 as described in the figures above. The major difference with the embodiment of the cart 600 is that there is not winch system on the cart as with the cart 200 described above. In general, the strap 130 is instead fixed to the cart 600 and the winch system is connected to the flat bed 510 trailer as discussed further in the description below.

The cart 600 includes a frame 605 and wheels 615a, 615b, 615c, 615d. The frame 605 includes side bars 620 generally defining a rear end 606 and a front end 607 of the frame 605. The rear end 606 of the frame 605 includes one or more hooks 640 that are used to interconnect with the holes 120 on the tarp 105 (see FIG. 1). The hooks 640 typically connect through the holes 120 on the tarp 105 to connect to the pole 125 as mentioned above and discussed further in the description below.

The frame 605 further includes cross bar 645 that generally connects between and generally perpendicular to the side bars 620 toward the approximate center of the cart 600. One end of two inner short bars 650 are connected generally perpendicular to the cross bar 645. The other end of the inner short bars 650 are connected to a first short cross bar 655. The first short cross bar 655 is typically connected to the lower portion of the inner short bars 650. A guide plate 660 having a slit 661 is connected between and angled with respect to the short inner bars 650. A second short bar and a guide loop is not shown as with the cart 200 described above. In general, with the above cart 200, the strap 130 moves with respect to the cart 200. Therefore, further guidance devices such as second cross bar 265 and guide loop 266 are needed to keep the strap 130 from straying. However, with the cart 600, the strap 130 remains fixed with respect to the cart 600, with a hook or other suitable connecting device on the strap 130 being connected to the slit 661 as the fixed point. Therefore, guidance devices are not necessarily needed. However, in another implementation, a second cross bar and guide loop can be added similar to the second cross bar 265 and guide loop 266 described above.

Referring still to FIG. 10., two axle bars 670 are connected between the end of the side bars 620 (at the front end 607 of the frame 605) and the end of the inner short bars 655 (at the front end 607 of the frame 605). The axle bars 670 are generally located above, offset from and in a generally parallel orientation to the first short cross bar 655.

The wheels 615 include two front wheels 615a, 615b separated by a first distance D1, and two rear wheels 615c, 615d separated by a second distance D2. Each of the front set of wheels is connected between the respective front end of the side bar 620 and the inner short bar 650. Each of the front wheels 615a, 615b is connected to and rotates about the respective axle bar 670. The rear wheels 615c, 615d are each connected to opposite ends of the cross bar 645. All the wheels 615 have substantially the same diameter. Similar to the cart 200 described above, the figure illustrates that the distance D1 between the front set of wheels 615a, 615b is less than the distance D2 between the rear set of wheels 615c, 615d. As described further below, the differential in the distances D1, D2 helps the cart 600 negotiate turns when used to wrap the tarp 105 around the load 520. A further discussion of the wheel 615 orientation is discussed below in the description with respect to FIG. 11.

FIG. 11 illustrates a side view of the embodiment of the cart 600 of FIG. 10. As discussed above, the cart 600 includes a frame 605 and wheels 615a, 615b, 615c, 615d. The frame 605 includes side bars 620 generally defining a rear end 606 and a front end 607 of the frame 605. The rear end 606 of the frame 605 includes one or more hooks 640 that are used to interconnect with the holes 120 on the tarp 105 (see FIG. 1). The hooks 640 are typically connected to the side bars 220 of the frame 605. The hooks 640 typically connect through the holes 120 on the tarp 105 to connect to the pole 125 as mentioned above and discussed further in the description below. The cross bar 645 is shown as a pivot point on wheel 615d. One of the axle bars 670 is shown as a pivot point on wheel 615b. The guide plate 660 is shown protruding from the frame 205.

As described above, the wheels 615 include two front wheels 615a, 615b separated by a first distance D1, and two rear wheels 615c, 615d separated by a second distance D2. Each of the front set of wheels is connected between the respective front end of the side bar 620 and the inner short bar 650. Each of the front wheels 615a, 615b is connected to and rotates about the respective axle bar 670. The rear wheels 615c, 615d are each connected to opposite ends of the cross bar 645. All the wheels 615 have substantially the same diameter. The figure illustrates that the distance D1 between the front set of wheels 615a, 615b is less than the distance D2 between the rear set of wheels 615c, 615d. Similar to as described above, the differential in the distances D1, D2 helps the cart 600 negotiate turns when used to wrap the tarp 105 around the load 520.

FIG. 11 further illustrates that the distance D3 defined between the edge of the front wheel 615b and the edge of the rear wheel 615d is generally less than the sum of the diameter of the front wheel 615b and the diameter of the rear wheel 615d. Similar to as described above, it has been determined that this resulting overlap of the wheels allows the cart 600 to travel easier over corners of loads as the cart 600 passes over turns in the loads. In general, by the front wheels 615a, 215b and the rear wheels 615c, 615d being overlapped in such a manner, any corners of the load 520 cannot actually contact the frame 605 of the cart 600. Instead, the corners, as described, simply edge into the corner 675 formed by the overlap of the front wheels 615a, 615b and rear wheels 615c, 615d. By the wheels 615 being able to rotate freely, the cart 600 is able to pass the corner without difficulty. If the wheels 615 are not overlapped, the corner can become snagged on the frame 605. It is understood that there are a variety of distances that the front 615a, 615b wheels and rear wheels 615c, 615d can be separated and overlapped to achieve the same results. Furthermore, it is understood, that the wheels 615 could also achieve the same result if the distance is generally equal to the sum of the diameter of the wheels 615. In addition, the same result could also be achieved if the distance D3 is just larger than the sum of the diameters of the wheels 615. Furthermore, the wheels can be in different arrangements. For example, the wheels 615 can be placed at the four corners of the frame 605 as in a typical vehicular arrangement. However, the front set of wheels 615a, 615b should typically not be too far displaced from the rear set of wheels 615c, 615d because the frame 605 may then come into contact with the corner of the truck 500 and become stuck or bound. It is understood that the cart 600 may also include sled blades. It is also understood that the cart 600 may just include a frame 605 without wheels or blades. It is further understood that the cart 600 is used as a carrying mechanism for the pole 125 and tarp 105.

Although no partial cutaway side view of the embodiment of the cart 600 is shown, it is understood that the strap 130 generally connects to the slit 661 on the guide plate 660 and can be looped underneath the first short cross bar 655 or other portions of the frame 605 in order to guide the strap 130 similar to as shown above with respect to FIG. 4. Therefore, the strap 130 can be directed from the guide plate 660 which is generally positioned high up on the cart 600, to a lower position on the cart 600, which is in turn closer to the load 520 that the tarp 105 is covering. In this way, both the tarp 105 and the strap 130 can generally be held close to the load 520 as the tarp 105 covers the load 520. By keeping this low profile of the tarp 105 and strap 130, various forces and torques on the cart 600 can be prevented.

Figure 12:
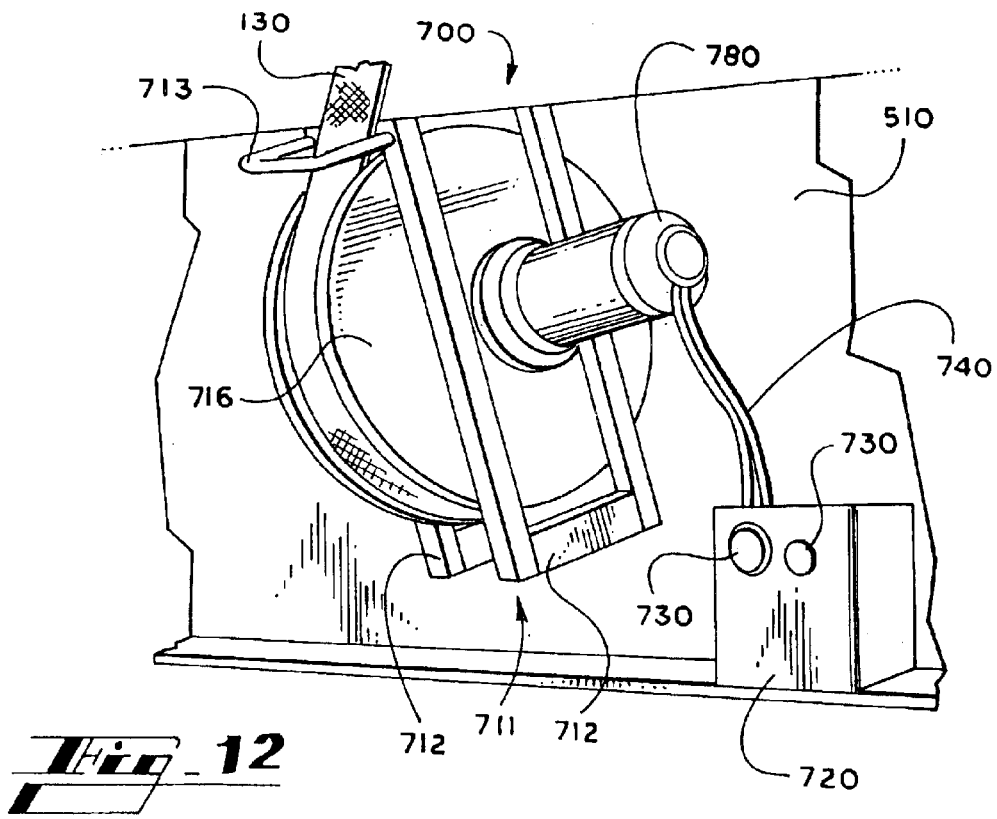
FIG. 12 illustrates a perspective view of an embodiment of a winch used in conjunction with the embodiment of the cart of FIGS. 10-11 as a load wrapping system.

FIG. 12 illustrates a perspective view of an embodiment of a winch system 700 used in conjunction with the embodiment of the cart 600 of FIGS. 10-11 as a load wrapping system. The winch system 700 is typically affixed to the side of the trailer 510 opposite the side that the cart 600 begins to cover the load 520 with the tarp 105. This opposite attachment generally makes it easier for the operator to subsequently adjust and remove the cart 600 after the tarp 105 has covered the load 520. Typically, the system 700 is placed at the fixed point 511 described with respect to FIGS. 6-9.

The winch system 700 generally includes a winch mount 711 that includes two upright and generally parallel side bars 712, a winch wheel 716 located between the side bars 712, a guide loop 713 and an axle 714 (see FIG. 13 below) about which the winch wheel 716 rotates. The winch system 700 further includes a motor 780 that is used to energize the winch wheel 716. In a typical implementation, a control unit 720 can be connected to the motor 780, typically through wires 740 in order to supply signals to turn the winch wheel 716. One or more controls 730 can be used to energize the winch wheel 716 as well as control the forward and reverse directions and speed of the winch wheel 716 as needed to pull the cart 600.

Figure 13:
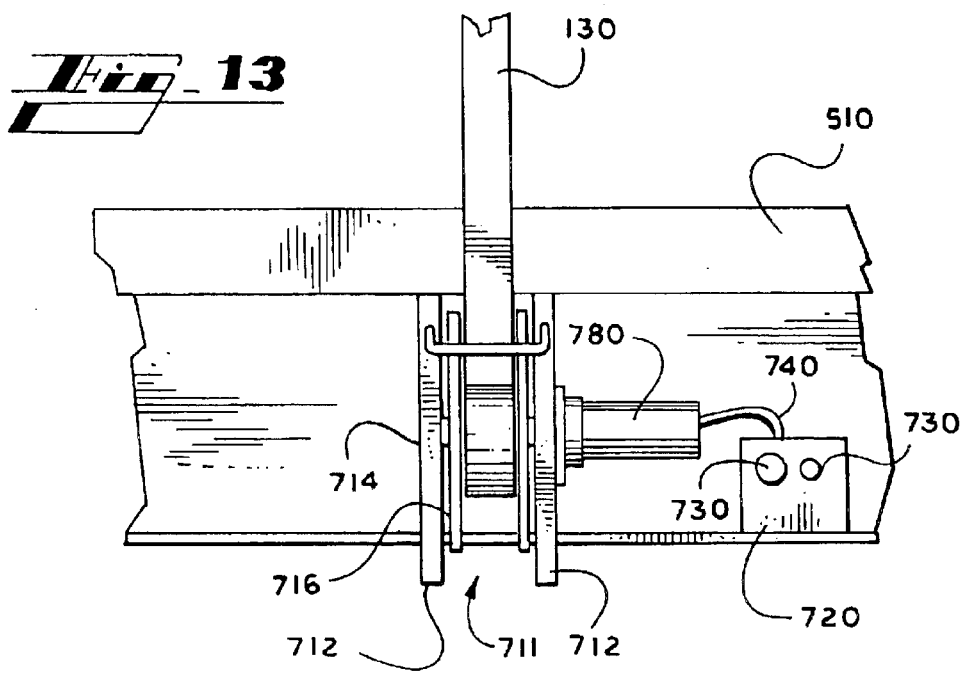
FIG. 13 illustrates a front view of the embodiment of the winch of FIG. 12.

FIG. 13 illustrates a front view of the embodiment of the winch system 700 of FIG. 12. The winch system 700 generally includes a winch mount 711 that includes two upright and generally parallel side bars 712, a winch wheel 716 located between the side bars 712, a guide loop 713 and an axle 714 about which the winch wheel 716 rotates. The winch system 700 further includes a motor 780 that is used to energize the winch wheel 716. In a typical implementation, a control unit 720 can be connected to the motor 780, typically through wires 740 in order to supply signals to turn the winch wheel 716. One or more controls 730 can be used to energize the winch wheel 716 as well as control the forward and reverse directions and speed of the winch wheel 716 as needed to pull the cart 600.

The load wrapping systems described above can be adapted as a kit to retrofit or fit systems (such as all types of trucks) that require the automated wrapping system. The load wrapping kit can include the tarp 105, the elongated pole 125 adapted to be connected into the pocket 115 on the leading edge 110 of the tarp 105, the strap 130, the cart (200, 600) adapted to be connected to the pole 125 and the strap 130, the winch system (210, 700) connected to the strap 130 and a power source adapted to energize the winch system (210, 700). In one kit, the winch system 210 is adapted to be connected to the cart 200. In another kit, the winch system 700 is adapted to be connected to a side of a frame of a flatbed trailer 510.

In another embodiment, the load wrapping system can include a cart connected to a tarp and means for moving the cart over and around the load to wrap the tarp over a load.

The method of wrapping a tarp 105 around a load 520 on a load surface such as the bed 515 of a flat bed truck 500 generally includes connecting the tarp 105 to the cart (200, 600), the cart (200, 600) being on one side of the truck 500, placing the strap 130 over the load 520, connecting one end of the strap 130 to the side of the trailer 510 opposite the side near the cart (200, 600), either on the fixed point 511 or the winch system 700, connecting the other end of the strap to the cart (200, 600) and moving the cart (200, 600) over the load 520, thereby covering the load 520 with the tarp 105. The bed can be any surface in which the load 520 sits. The bed can be a truck bed as described above, flats on the ground or the ground itself. As the cart travels along strap 130, it is maintained against the load due to the interaction of bars 255 and 265 and strap 130. This interaction maintains the cart on the strap and against the load, thereby preventing the cart from falling off the load as it is in the vertical climb mode.

The foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A load wrapping system, comprising:
    a tarp;
    an elongated pole located in an elongated pocket on a leading edge of the tarp;
    a cart having a winch system and a frame having hooks adapted to connect to the pole;
    a strap having one end connected to the winch and the other end including a connector adapted to connect to a load surface.

2. The system as claimed in claim 1, wherein the cart includes a set of rear wheels having a diameter and a separated by a first distance and a set of front wheels having a diameter and separated by a second distance.

3. The system as claimed in claim 2, wherein the distance between an outer edge of the front wheels and an outer edge of the rear wheels is less than the sum of the diameter of one of the rear wheels and the diameter of one of the front wheels.

4. The system as claimed in claim 1 wherein the frame includes a guide plate adjacent the winch system, the strap being adapted to fit through a slit on the guide plate.

5. The system as claimed in claim 2 wherein the frame further comprises a first short cross bar connected adjacent the front wheels and adapted to re-direct the strap.

6. A load wrapping system, comprising:
    a tarp;
    an elongated pole located within an elongated pocket on a leading edge of the tarp;
    a cart including a frame having hooks adapted to connect to the pole;
    a winch system connected to a side of a loading surface; and
    a strap having one end connected to the winch system and the other end connected to the cart.

7. The system as claimed in claim 6 wherein the cart includes a set of rear wheels having a diameter and a separated by a first distance and a set of front wheels having a diameter and separated by a second distance.

8. The system as claimed in claim 7, wherein the distance between the outer edge of the front wheels and an outer edge of the rear wheels is less than the sum of the diameter of one of the rear wheels and the diameter of one of the front wheels.

9. A load wrapping system, comprising:
    a tarp;
    an elongated pole located within an elongated pocket on a leading edge of the tarp;
    a cart including a frame having a set of rear wheels having a diameter and a separated by a first distance and a set of front wheels having a diameter and separated by a second distance;
    a winch system connected to a side of a loading surface; and
    a strap having one end connected to the winch system and the other end connected to the cart.

10. A load wrapping system, comprising:
    a tarp;
    an elongate pole located within an elongated pocket on a leading edge of the tarp;
    a winch system connected to a side of a loading surface;
    a cart including a frame having a guide plate adjacent the winch system, the strap being adapted to fit through a slit on the guide plate; and
    a strap having one end connected to the winch system and the other end connected to the cart.

* * * * *